US011909162B2

(12) United States Patent
Kropiewnicki

(10) Patent No.: US 11,909,162 B2
(45) Date of Patent: Feb. 20, 2024

(54) SOCKET CONTACT HAVING LATERAL CABLE OUTLET

(71) Applicant: HARTING Electric Stiftung & Co. KG, Espelkamp (DE)

(72) Inventor: Norbert Kropiewnicki, Bielefeld (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 42 days.

(21) Appl. No.: 17/760,821

(22) PCT Filed: Nov. 23, 2020

(86) PCT No.: PCT/DE2020/100989
§ 371 (c)(1),
(2) Date: Mar. 16, 2022

(87) PCT Pub. No.: WO2021/104572
PCT Pub. Date: Jun. 3, 2021

(65) Prior Publication Data

US 2022/0393374 A1 Dec. 8, 2022

(30) Foreign Application Priority Data

Nov. 27, 2019 (DE) ..................... 10 2019 132 127.1

(51) Int. Cl.
*H01R 9/24* (2006.01)

(52) U.S. Cl.
CPC ................................. *H01R 9/2408* (2013.01)

(58) Field of Classification Search
CPC .................................................... H01R 9/2408
See application file for complete search history.

(56) References Cited

U.S. PATENT DOCUMENTS

| | | | | | |
|---|---|---|---|---|---|
| 3,901,577 | A * | 8/1975 | Philibert | H01R 4/643 439/811 |
| 4,386,820 | A * | 6/1983 | Dola | H01R 13/6453 439/651 |
| 7,081,027 | B2 * | 7/2006 | Woodward | H01R 9/24 439/777 |
| 9,379,468 | B2 * | 6/2016 | Zieman | H01R 12/91 |
| 2003/0068931 | A1 | 4/2003 | Swearingen et al. | |
| 2013/0052888 | A1 | 2/2013 | Wolting et al. | |
| 2014/0120760 | A1 | 5/2014 | Zieman et al. | |

FOREIGN PATENT DOCUMENTS

| | | | |
|---|---|---|---|
| CN | 206585111 | U | 10/2017 |
| DE | 202004005593 | U1 | 8/2005 |
| EP | 2061119 | A2 | 5/2009 |
| EP | 2569825 | A1 | 5/2018 |
| FR | 2932613 | A1 | 12/2009 |

* cited by examiner

*Primary Examiner* — Ross N Gushi
(74) *Attorney, Agent, or Firm* — Smartpat PLC

(57) ABSTRACT

An electrical contact element (1) for transmitting high currents has a connection region (A) and a contact region (K). The connection region (A) has a cylindrical opening (2) and the contact region (K) has a cylindrical passage opening (3). The opening (2) and the passage opening (3) are oriented orthogonally relative to each other and a peripheral contact strip (4) is arranged within the cylindrical passage opening (3).

15 Claims, 3 Drawing Sheets

SOCKET CONTACT HAVING LATERAL CABLE OUTLET

TECHNICAL FIELD

The disclosure relates to an electrical contact element for transmitting high currents. Such contact elements are used in particular in the rail industry. It is often the case that such a contact element is exposed to a current of a thousand amperes or more.

BACKGROUND

EP 2 569 825 B1 shows a contact element which can be configured as a socket contact or as a pin contact. In the case of the socket contact, the opening in the connection region and the opening in the contact region extend in parallel. The contact laminations of the socket contact define the contact points with a mating pin contact. As a result, each socket contact can be contacted with precisely one pin contact in an electrically conducting manner.

The German Patent and Trademark Office has searched the following prior art in the priority application pertaining to the present application: FR 2 932 613 A1, DE 20 2004 005 593 U1, CN 206 585 111 U and US 2003/0068931 A1.

SUMMARY

The problem addressed by the disclosure consists in providing a high-performance electrical contact element which can also be used in compact installation situations.

The problem is solved by the subject matter of the independent claims.

Advantageous embodiments of the invention are specified in the dependent claims and the following description.

The electrical contact element is provided for transmitting high currents. It is often the case here that current intensities of a thousand amperes or more occur.

The electrical contact element has a connection region and a contact region. The connection region has a cylindrical opening and advantageously forms a crimp connection. The contact region has a cylindrical passage opening. The contact region has a plugging side on which a mating contact pin of a pin contact element is inserted into the passage opening. The contact region has, on the opposite side of the plugging side, an outlet side from which the contact pin of the pin contact element exits again.

The opening of the connection region or crimp region and the passage opening of the contact region extend orthogonally to one another. This means that the extended direction vectors of the openings intersect orthogonally.

An areal contact between the socket contact and a mating pin contact would result in powerful heating of the plug-in connection. A peripheral contact strip is therefore arranged within the cylindrical passage opening. Specific contact points between the socket contact and the pin contact are defined by way of the contact strip. As a result, the contact resistance of the plug-in connection is reduced.

The contact strip does not extend within the entire passage opening. Advantageously, the peripheral contact strip is arranged approximately centrally in the cylindrical passage opening of the connection region. This prevents so-called wobbling of the contact pin as far as possible.

The contact strip advantageously consists of a material which contains beryllium. Such a material ensures a reliable current bridge between the contact pin and contact socket. Particularly preferred here are alloys such as beryllium copper or copper beryllium.

As already mentioned above, the contact region of the contact element has a plugging side and an outlet side. Preferably, a recess is incorporated in the plugging side and the outlet side is provided with an elevation. The recess and the elevation are designed to be complementary to one another. As a result, a plurality of contact elements can be lined up in a form-fitting manner.

In a particularly advantageous embodiment, the recess and the elevation of the contact region have a substantially rectangular cross section. As a result, the contact elements can be lined up so as to be offset from one another by 90°, or a multiple thereof.

The electrical contact element preferably consists substantially of copper. This ensures good electrical conductivity, in particular with respect to other materials, such as brass, for example. The surface of the copper base body of the contact element is coated with a silver or silver alloy layer. As a result, the current-carrying capacity of the contact element is further increased significantly.

The electrical contact element is advantageously rotationally symmetrical. As a result, the contact element can be produced from solid material in a simple manner in one machining operation.

BRIEF DESCRIPTION OF THE DRAWINGS

An exemplary embodiment of the invention is illustrated in the drawings and explained in more detail below. In the drawings.

DETAILED DESCRIPTION

The figures contain partially simplified, schematic illustrations. Identical reference signs are used in part for like, but possibly not identical elements. Different views of like elements could be scaled differently.

Indications of direction, such as "left", "right", "top" and "bottom", for example, are to be understood in relation to the respective figure and can vary in the individual illustrations with respect to the illustrated object.

Figure 1:
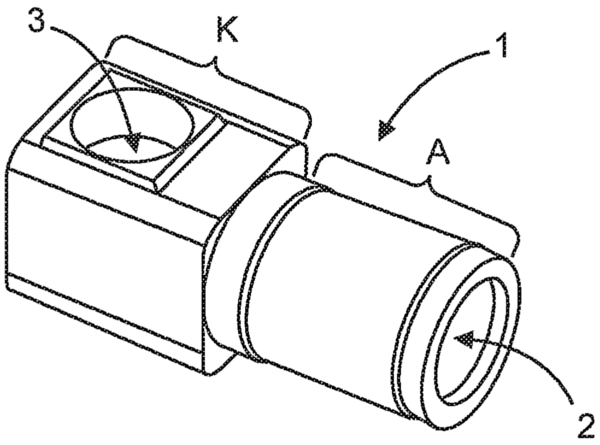
FIG. 1 shows a perspective illustration of a contact element.

FIG. 1 shows one possible embodiment of a contact element 1. The contact element 1 is configured to be solid and is, for example, worked out of a solid copper workpiece in one machining operation. The contact element 1 is therefore particularly suitable for transmitting high currents.

Figure 2:
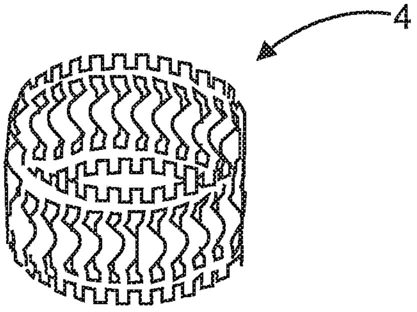
FIG. 2 shows a perspective illustration of a contact strip.
Figure 3:
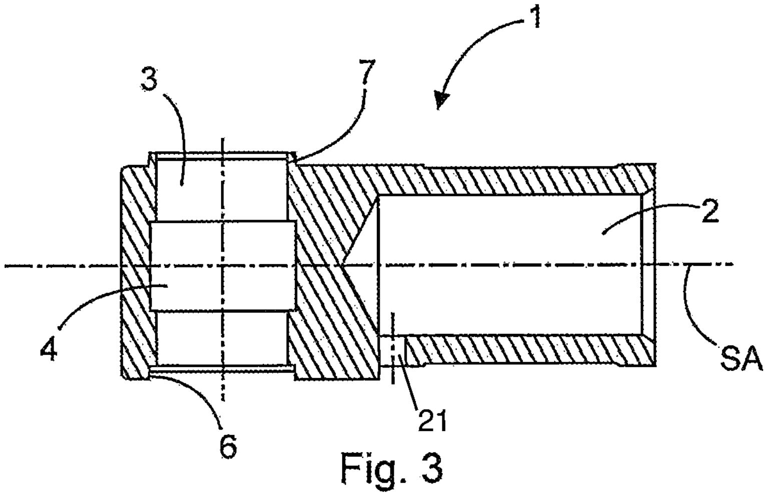
FIG. 3 shows a sectional illustration of the contact element.

The contact element 1 has a connection region A and a contact region K. The connection region A has a cylindrical opening 2 extending along an axis of symmetry SA and the contact region has a cylindrical passage opening 3. The opening 2 and the passage opening 3 or the main axes of symmetry thereof extend orthogonally to one another. A peripheral contact strip 4, which is illustrated slightly enlarged in FIG. 2, is arranged approximately centrally within the cylindrical passage opening 3. The connection region A includes a through hole 21 that extends parallel to the passage opening at an inner end of the cylindrical opening 2. The trough hole 21 extends from the cylindrical opening 2 towards a plugging side ST of the contact element 1.

Figure 4:
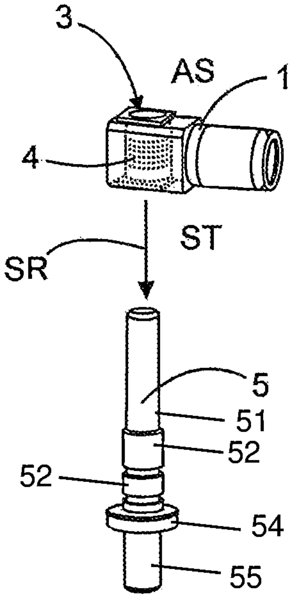
FIG. 4 shows a perspective illustration of a contact element and of a mating counterpart contact element (pin contact)

The contact element 1 is guided in the plugging direction SR toward the counterpart contact element 5, as can be seen in FIG. 4. The contact strip 4 has a grid-shaped basic structure which is joined together to form a ring. The contact strip 4 defines the electrical contact points which a mating counterpart contact element 5, in this case a contact pin, forms with the contact element 1, in this case a socket contact. The contact pin 5 is a cylindrical body including a receiving portion 51 for a plurality of contact elements 1. The receiving portion 51 is separated from an end portion 55 by a flange 54. A plurality of shoulders 52 is arranged between the flange 54 and the receiving portion 51. A diameter of the shoulders 52 is greater than a diameter of the receiving portion 51 and smaller than a diameter of the flange 54.

Figure 5:
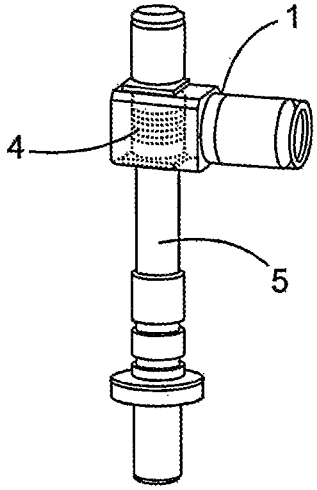
FIG. 5 shows a perspective illustration of the contact element plugged with the counterpart contact element.

The contact strip 4 preferably consists of a beryllium-containing material. In FIGS. 4 and 5, the contact element 1 is formed transparently in order that the contact strip 4 arranged in the contact region K can be seen. It can be seen in FIG. 5 that, in the plugged state, the contact strip 4 contactingly encloses the pin contact 5 penetrating through the passage opening 3. The contact strip 4 accordingly forms a contact bridge between the socket contact 1 and the pin contact 5.

Figure 7:
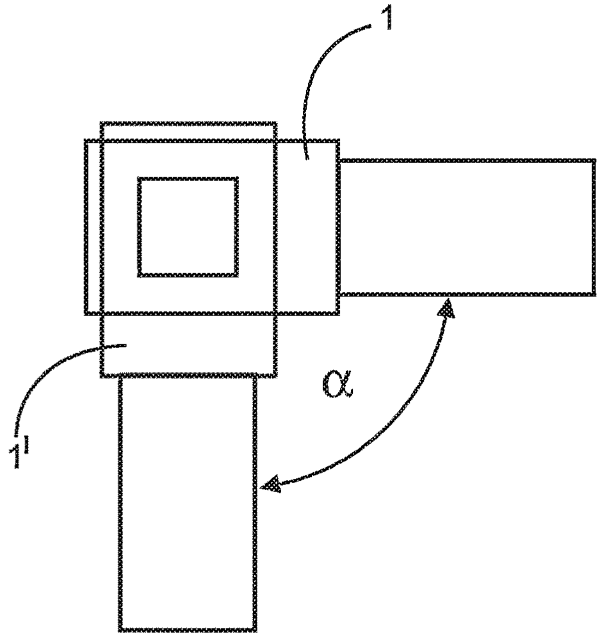
FIG. 7 shows a schematic plan view of two joined-together contact elements.

The contact region K of the contact element 1 has a plugging side ST and, opposite therefrom, an outlet side AS. On the plugging side ST there is provided a recess 6, and the outlet side AS has an elevation 7 which is designed to be complementary to the recess 6. The recess 6 and the elevation 7 have a substantially rectangular cross section. As a result, the openings 2, 2', 2" in the connection regions A of different, but similar-type contact elements 1, 1', 1" can enclose an angle (α) with one another. This angular position is schematically illustrated in FIG. 7.

Figure 6:
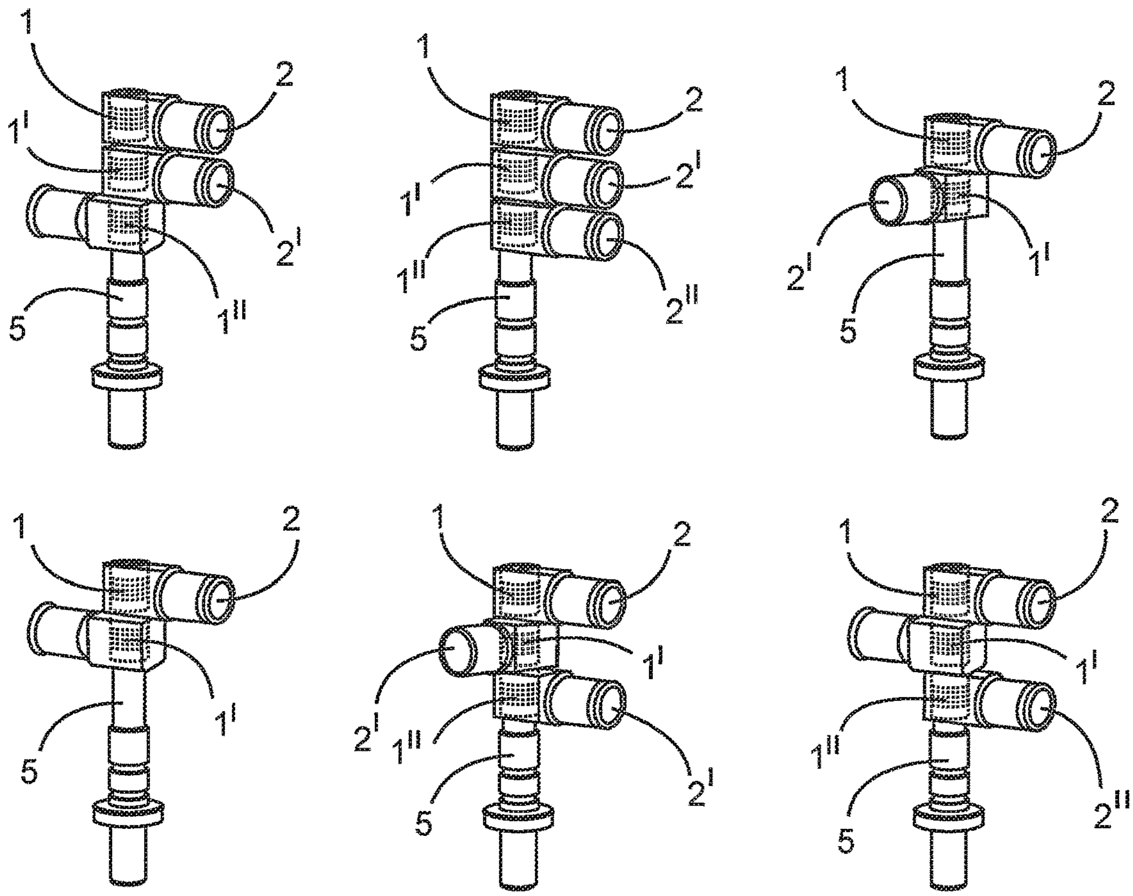
FIG. 6 shows a perspective illustration of different combinatorial variants of a plurality of contact elements which are connected together with a counterpart contact element in an electrically conducting manner.

By virtue of the substantially square cross section of the recess 6 and of the elevation 7, the angle (α) can be equal to 90° or a multiple of 90°. In the case of different cross-sectional geometries, it is correspondingly possible for different angular positions to be achieved. Different orientations between lined-up contact elements 1, 1', 1" are illustrated in FIG. 6.

Even though various aspects or features of the invention are respectively show in combination in the figures, it is clear to a person skilled in the art that—unless otherwise stated—the combinations shown and discussed are not the only ones possible. In particular, mutually corresponding units or complexes of features from different exemplary embodiments can be exchanged with one another.

LIST OF REFERENCE SIGNS

1 Contact element
2 Opening
3 Passage opening
4 Contact strip
5 Counterpart contact element
6 Recess
7 Elevation
A Connection region
K Contact region
ST Plugging side
AS Outlet side
SR Plugging direction
α Angle
SA Axis of symmetry

The invention claimed is:

1. A system, comprising:
a first electrical contact element (1) being a solid body made of copper, including
a first connection region (A) and
a first contact region (K),
wherein the first connection region (A) has a first cylindrical opening (2) and the first contact region (K) has a first cylindrical passage opening (3),
wherein the first cylindrical opening (2) and the first cylindrical passage opening (3) are oriented orthogonally to one another,
wherein the first contact region (K) has a plugging side (ST) and an outlet side (AS), and
wherein the plugging side (ST) has a first recess (6) and the outlet side (AS) has a first elevation (7);
a first peripheral contact strip (4) arranged within the first cylindrical passage opening (3), but not extending along the entire first cylindrical passage opening (3);
a second electrical contact element (1') being a solid body made of copper, including
a second connection region (A) and
a second contact region (K),
wherein the second connection region (A) has a second cylindrical opening (2) and the second contact region (K) has a second cylindrical passage opening (3),
wherein the second cylindrical opening (2) and the second cylindrical passage opening (3) are oriented orthogonally to one another, and
wherein the second contact region (K) has a plugging side (ST) and a outlet side (AS),
wherein the plugging side (ST) has a second recess (6) and the outlet side (AS) has a second elevation (7),
wherein the first elevation (7) on the outlet side (AS) of the first electrical contact element (1) is inserted into the second recess (6) of the plugging side (ST) of the second electrical contact element (1') in one of a plurality of possible orientations; and
a second peripheral contact strip (4) arranged within the second cylindrical passage opening (3), but not extending along the entire second cylindrical passage opening (3).

2. The system as claimed in claim 1,
wherein the first connection region (A) is formed as a crimp connection.

3. The system as claimed in claim 1,
wherein the first peripheral contact strip (4) is arranged approximately centrally in the first cylindrical passage opening (3) of the first connection region (A).

4. The system as claimed in claim 1,
wherein the second recess (6) and the first elevation (7) have a substantially rectangular, triangular or star-shaped cross section.

5. The system as claimed in claim 1,
wherein the first electrical contact element (1) consists substantially of copper, and
wherein a surface of the first electrical contact element (1) is coated with a silver or silver alloy layer.

6. The system as claimed in claim 1, wherein the first peripheral contact strip (4) consists of a material which contains beryllium.

7. The system as claimed in claim 1, wherein the first cylindrical passage opening (3) of the first electrical contact element (1) and the second cylindrical passage opening (3) of the second electrical contact element (1') are oriented parallel to one another.

8. The system as claimed in claim 1, wherein the first cylindrical opening (2) of the first electrical contact element (1) and the second cylindrical opening (2') of the second electrical contact element (1') enclose an angle (α) with one another, and wherein the angle (α) is equal to 90° or a multiple of 90°.

9. The system as claimed in claim 1, wherein the first connection region (A) includes a through hole (21) that extends parallel to the cylindrical passage opening (3) at an inner end of the cylindrical opening (2).

10. The system as claimed in claim 9, wherein the through hole (21) extends from the cylindrical opening (2) towards the plugging side (ST).

11. The system as claimed in claim 1, further comprising a contact pin (5), wherein the contact pin (5) extends through the first cylindrical passage opening (3) and the second cylindrical passage opening (3).

12. The system as claimed in claim 11, wherein the contact pin (5) is a cylindrical body including a receiving portion (51) for the first electrical contact element (1) and the second electrical contact element (1'), wherein the receiving portion (51) is separated from an end portion (55) by a flange (54).

13. The system as claimed in claim 12, wherein a plurality of shoulders (52) are arranged between the flange (54) and the receiving portion (51), and wherein a diameter of the shoulders (52) is greater than a diameter of the receiving portion (51) and smaller than a diameter of the flange (54).

14. The system as claimed in claim 11, wherein the first peripheral contact strip (4) has a grid-shaped structure which is joined together to form a ring, and wherein the first peripheral contact strip (4) defines electrical contact points with the contact pin (5).

15. The system as claimed in claim 1, wherein the first electrical contact element (1) comprises a silver or silver alloy coating layer.

* * * * *